US009552497B2

(12) United States Patent
Agarwal et al.

(10) Patent No.: US 9,552,497 B2
(45) Date of Patent: Jan. 24, 2017

(54) SYSTEM AND METHOD FOR PREVENTING DATA LOSS USING VIRTUAL MACHINE WRAPPED APPLICATIONS

(75) Inventors: Sonali Agarwal, Bangalore (IN); Lee Codel Lawson Tarbotton, Buckinghamshire (GB)

(73) Assignee: McAfee, Inc., Santa Clara, CA (US)

( * ) Notice: Subject to any disclaimer, the term of this patent is extended or adjusted under 35 U.S.C. 154(b) by 798 days.

(21) Appl. No.: 12/615,521

(22) Filed: Nov. 10, 2009

(65) Prior Publication Data
US 2011/0113467 A1    May 12, 2011

(51) Int. Cl.
*G06F 17/00* (2006.01)
*G06F 21/62* (2013.01)
*G06F 21/53* (2013.01)
*G06F 21/12* (2013.01)
*H04L 29/06* (2006.01)

(52) U.S. Cl.
CPC ......... *G06F 21/6281* (2013.01); *G06F 21/128* (2013.01); *G06F 21/53* (2013.01); *H04L 63/20* (2013.01)

(58) Field of Classification Search
CPC ...... H04L 63/20; G06F 21/6281; G06F 21/53; G06F 21/128
See application file for complete search history.

(56) References Cited

U.S. PATENT DOCUMENTS

| 4,688,169 | A | 8/1987 | Joshi |
| 4,982,430 | A | 1/1991 | Frezza et al. |
| 5,155,847 | A | 10/1992 | Kirouac et al. |
| 5,222,134 | A | 6/1993 | Waite et al. |

(Continued)

FOREIGN PATENT DOCUMENTS

| CN | 101399835 | 4/2009 |
| EP | 1 482 394 A2 | 12/2004 |

(Continued)

OTHER PUBLICATIONS

Derek Bem et al., "Computer Forensic Analysis in a Virtual Environment," International Journal of Digital Evidence, Fall 2007, vol. 6, Issue 2, pp. 1-13.*

(Continued)

*Primary Examiner* — Luu Pham
*Assistant Examiner* — Canh Le
(74) *Attorney, Agent, or Firm* — Patent Capital Group

(57) ABSTRACT

A method in one example implementation includes selecting at least one criterion for controlling data transmission from within a virtual machine. At least one application is included within the virtual machine, which includes a policy module. The selected criterion corresponds to at least one policy associated with the policy module. The method also includes evaluating the selected criterion of the policy to permit an attempt to transmit the data from within the virtual machine. In more specific embodiments, the policy may include a plurality of criteria with a first selected criterion permitting transmission of the data to a first application and a second selected criterion prohibiting transmission of the data to a second application. In another specific embodiment, the method may include updating the policy module through an administration module to modify the selected criterion.

17 Claims, 4 Drawing Sheets

(56) References Cited

U.S. PATENT DOCUMENTS

| | | | |
|---|---|---|---|
| 5,390,314 A | 2/1995 | Swanson | |
| 5,521,849 A | 5/1996 | Adelson et al. | |
| 5,560,008 A | 9/1996 | Johnson et al. | |
| 5,699,513 A | 12/1997 | Feigen et al. | |
| 5,778,226 A | 7/1998 | Adams et al. | |
| 5,778,349 A | 7/1998 | Okonogi | |
| 5,787,427 A | 7/1998 | Benantar et al. | |
| 5,842,017 A | 11/1998 | Hookway et al. | |
| 5,907,709 A | 5/1999 | Cantey et al. | |
| 5,907,860 A | 5/1999 | Garibay et al. | |
| 5,926,832 A | 7/1999 | Wing et al. | |
| 5,974,149 A | 10/1999 | Leppek | |
| 5,987,610 A | 11/1999 | Franczek et al. | |
| 5,987,611 A | 11/1999 | Freund | |
| 5,991,881 A | 11/1999 | Conklin et al. | |
| 6,064,815 A | 5/2000 | Hohensee et al. | |
| 6,073,142 A | 6/2000 | Geiger et al. | |
| 6,141,698 A | 10/2000 | Krishnan et al. | |
| 6,192,401 B1 | 2/2001 | Modiri et al. | |
| 6,192,475 B1 | 2/2001 | Wallace | |
| 6,256,773 B1 | 7/2001 | Bowman-Amuah | |
| 6,275,938 B1 | 8/2001 | Bond et al. | |
| 6,321,267 B1 | 11/2001 | Donaldson | |
| 6,338,149 B1 | 1/2002 | Ciccone, Jr. et al. | |
| 6,356,957 B2 | 3/2002 | Sanchez, II et al. | |
| 6,393,465 B2 | 5/2002 | Leeds | |
| 6,433,794 B1 * | 8/2002 | Beadle | G06F 9/44505 715/700 |
| 6,442,686 B1 | 8/2002 | McArdle et al. | |
| 6,449,040 B1 | 9/2002 | Fujita | |
| 6,453,468 B1 | 9/2002 | D'Souza | |
| 6,460,050 B1 | 10/2002 | Pace et al. | |
| 6,587,877 B1 | 7/2003 | Douglis et al. | |
| 6,611,925 B1 | 8/2003 | Spear | |
| 6,662,219 B1 | 12/2003 | Nishanov et al. | |
| 6,748,534 B1 | 6/2004 | Gryaznov et al. | |
| 6,769,008 B1 | 7/2004 | Kumar et al. | |
| 6,769,115 B1 | 7/2004 | Oldman | |
| 6,795,966 B1 | 9/2004 | Lim et al. | |
| 6,832,227 B2 | 12/2004 | Seki et al. | |
| 6,834,301 B1 | 12/2004 | Hanchett | |
| 6,847,993 B1 | 1/2005 | Novaes et al. | |
| 6,907,600 B2 | 6/2005 | Neiger et al. | |
| 6,918,110 B2 | 7/2005 | Hundt et al. | |
| 6,930,985 B1 | 8/2005 | Rathi et al. | |
| 6,934,755 B1 | 8/2005 | Saulpaugh et al. | |
| 6,988,101 B2 | 1/2006 | Ham et al. | |
| 6,988,124 B2 | 1/2006 | Douceur et al. | |
| 7,007,302 B1 | 2/2006 | Jagger et al. | |
| 7,010,796 B1 | 3/2006 | Strom et al. | |
| 7,024,548 B1 | 4/2006 | O'Toole, Jr. | |
| 7,039,949 B2 | 5/2006 | Cartmell et al. | |
| 7,065,767 B2 | 6/2006 | Kambhammettu et al. | |
| 7,069,330 B1 | 6/2006 | McArdle et al. | |
| 7,082,456 B2 | 7/2006 | Mani-Meitav et al. | |
| 7,093,239 B1 | 8/2006 | van der Made | |
| 7,124,409 B2 | 10/2006 | Davis et al. | |
| 7,139,916 B2 | 11/2006 | Billingsley et al. | |
| 7,152,148 B2 | 12/2006 | Williams et al. | |
| 7,159,036 B2 | 1/2007 | Hinchliffe et al. | |
| 7,177,267 B2 | 2/2007 | Oliver et al. | |
| 7,203,864 B2 | 4/2007 | Goin et al. | |
| 7,251,655 B2 | 7/2007 | Kaler et al. | |
| 7,290,266 B2 | 10/2007 | Gladstone et al. | |
| 7,302,558 B2 | 11/2007 | Campbell et al. | |
| 7,330,849 B2 | 2/2008 | Gerasoulis et al. | |
| 7,346,781 B2 | 3/2008 | Cowie et al. | |
| 7,349,931 B2 | 3/2008 | Horne | |
| 7,350,204 B2 | 3/2008 | Lambert et al. | |
| 7,353,501 B2 | 4/2008 | Tang et al. | |
| 7,363,022 B2 | 4/2008 | Whelan et al. | |
| 7,370,360 B2 | 5/2008 | van der Made | |
| 7,406,517 B2 | 7/2008 | Hunt et al. | |
| 7,441,265 B2 | 10/2008 | Staamann et al. | |
| 7,464,408 B1 | 12/2008 | Shah et al. | |
| 7,506,155 B1 | 3/2009 | Stewart et al. | |
| 7,506,170 B2 | 3/2009 | Finnegan | |
| 7,506,364 B2 | 3/2009 | Vayman | |
| 7,546,333 B2 | 6/2009 | Alon et al. | |
| 7,546,594 B2 | 6/2009 | McGuire et al. | |
| 7,552,479 B1 | 6/2009 | Conover et al. | |
| 7,577,995 B2 | 8/2009 | Chebolu et al. | |
| 7,607,170 B2 | 10/2009 | Chesla | |
| 7,657,599 B2 | 2/2010 | Smith | |
| 7,669,195 B1 | 2/2010 | Qumei | |
| 7,685,635 B2 | 3/2010 | Vega et al. | |
| 7,698,744 B2 | 4/2010 | Fanton et al. | |
| 7,703,090 B2 | 4/2010 | Napier et al. | |
| 7,757,269 B1 | 7/2010 | Roy-Chowdhury et al. | |
| 7,765,538 B2 | 7/2010 | Zweifel et al. | |
| 7,809,704 B2 | 10/2010 | Surendran et al. | |
| 7,818,377 B2 | 10/2010 | Whitney et al. | |
| 7,823,148 B2 | 10/2010 | Deshpande et al. | |
| 7,836,504 B2 | 11/2010 | Ray et al. | |
| 7,849,507 B1 | 12/2010 | Bloch et al. | |
| 7,856,661 B1 | 12/2010 | Sebes et al. | |
| 7,865,931 B1 | 1/2011 | Stone et al. | |
| 7,870,387 B1 | 1/2011 | Bhargava et al. | |
| 7,895,573 B1 | 2/2011 | Bhargava et al. | |
| 7,908,653 B2 * | 3/2011 | Brickell et al. | 726/22 |
| 7,937,455 B2 | 5/2011 | Saha et al. | |
| 7,966,659 B1 | 6/2011 | Wilkinson et al. | |
| 7,996,836 B1 | 8/2011 | McCorkendale et al. | |
| 8,015,388 B1 | 9/2011 | Rihan et al. | |
| 8,015,563 B2 * | 9/2011 | Araujo et al. | 718/1 |
| 8,234,713 B2 | 7/2012 | Roy-Chowdhury et al. | |
| 8,307,437 B2 | 11/2012 | Sebes et al. | |
| 8,321,932 B2 | 11/2012 | Bhargava et al. | |
| 8,341,627 B2 | 12/2012 | Mohinder | |
| 8,381,284 B2 | 2/2013 | Dang et al. | |
| 2002/0056076 A1 | 5/2002 | van der Made | |
| 2002/0069367 A1 | 6/2002 | Tindal et al. | |
| 2002/0083175 A1 | 6/2002 | Afek et al. | |
| 2002/0099671 A1 | 7/2002 | Mastin et al. | |
| 2003/0014667 A1 | 1/2003 | Kolichtchak | |
| 2003/0023736 A1 | 1/2003 | Abkemeier | |
| 2003/0033510 A1 | 2/2003 | Dice | |
| 2003/0073894 A1 | 4/2003 | Chiang et al. | |
| 2003/0074552 A1 | 4/2003 | Olkin et al. | |
| 2003/0093508 A1 * | 5/2003 | Li | G06F 8/65 709/222 |
| 2003/0115222 A1 | 6/2003 | Oashi et al. | |
| 2003/0120601 A1 | 6/2003 | Ouye et al. | |
| 2003/0120811 A1 | 6/2003 | Hanson et al. | |
| 2003/0120935 A1 | 6/2003 | Teal et al. | |
| 2003/0139975 A1 * | 7/2003 | Perkowski | G06F 17/30879 705/14.73 |
| 2003/0145232 A1 | 7/2003 | Poletto et al. | |
| 2003/0163718 A1 | 8/2003 | Johnson et al. | |
| 2003/0167292 A1 | 9/2003 | Ross | |
| 2003/0167399 A1 | 9/2003 | Audebert et al. | |
| 2003/0200332 A1 | 10/2003 | Gupta et al. | |
| 2003/0212902 A1 | 11/2003 | van der Made | |
| 2003/0220944 A1 | 11/2003 | Schottland et al. | |
| 2003/0221190 A1 | 11/2003 | Deshpande et al. | |
| 2004/0003258 A1 | 1/2004 | Billingsley et al. | |
| 2004/0015554 A1 | 1/2004 | Wilson | |
| 2004/0051736 A1 | 3/2004 | Daniell | |
| 2004/0054928 A1 | 3/2004 | Hall | |
| 2004/0143749 A1 | 7/2004 | Tajali et al. | |
| 2004/0167906 A1 | 8/2004 | Smith et al. | |
| 2004/0230963 A1 | 11/2004 | Rothman et al. | |
| 2004/0243678 A1 | 12/2004 | Smith | |
| 2004/0255161 A1 | 12/2004 | Cavanaugh | |
| 2005/0018651 A1 | 1/2005 | Yan et al. | |
| 2005/0086047 A1 | 4/2005 | Uchimoto et al. | |
| 2005/0108516 A1 | 5/2005 | Balzer et al. | |
| 2005/0108562 A1 | 5/2005 | Khazan et al. | |
| 2005/0114672 A1 | 5/2005 | Duncan et al. | |
| 2005/0132346 A1 | 6/2005 | Tsantilis | |
| 2005/0228990 A1 | 10/2005 | Kato et al. | |
| 2005/0235360 A1 | 10/2005 | Pearson | |
| 2005/0257207 A1 | 11/2005 | Blumfield et al. | |
| 2005/0257265 A1 | 11/2005 | Cook et al. | |

(56) References Cited

U.S. PATENT DOCUMENTS

| | | | |
|---|---|---|---|
| 2005/0260996 A1 | 11/2005 | Groenendaal | |
| 2005/0262558 A1 | 11/2005 | Usov | |
| 2005/0273858 A1 | 12/2005 | Zadok et al. | |
| 2005/0283823 A1 | 12/2005 | Okajo et al. | |
| 2005/0289538 A1 | 12/2005 | Black-Ziegelbein et al. | |
| 2006/0004875 A1 | 1/2006 | Baron et al. | |
| 2006/0015501 A1 | 1/2006 | Sanamrad et al. | |
| 2006/0021029 A1* | 1/2006 | Brickell | G06F 21/51 726/22 |
| 2006/0037016 A1 | 2/2006 | Saha et al. | |
| 2006/0080656 A1 | 4/2006 | Cain et al. | |
| 2006/0085785 A1 | 4/2006 | Garrett | |
| 2006/0101277 A1 | 5/2006 | Meenan et al. | |
| 2006/0133223 A1 | 6/2006 | Nakamura et al. | |
| 2006/0136910 A1* | 6/2006 | Brickell et al. | 718/1 |
| 2006/0136911 A1* | 6/2006 | Robinson et al. | 718/1 |
| 2006/0195906 A1 | 8/2006 | Jin et al. | |
| 2006/0200863 A1 | 9/2006 | Ray et al. | |
| 2006/0230314 A1 | 10/2006 | Sanjar et al. | |
| 2006/0236398 A1 | 10/2006 | Trakic et al. | |
| 2006/0259734 A1 | 11/2006 | Sheu et al. | |
| 2007/0011746 A1 | 1/2007 | Malpani et al. | |
| 2007/0028303 A1 | 2/2007 | Brennan | |
| 2007/0039049 A1 | 2/2007 | Kupferman et al. | |
| 2007/0050579 A1 | 3/2007 | Hall et al. | |
| 2007/0050764 A1 | 3/2007 | Traut | |
| 2007/0074199 A1 | 3/2007 | Schoenberg | |
| 2007/0083522 A1 | 4/2007 | Nord et al. | |
| 2007/0101435 A1 | 5/2007 | Konanka et al. | |
| 2007/0136579 A1* | 6/2007 | Levy | H04L 63/102 713/168 |
| 2007/0143851 A1 | 6/2007 | Nicodemus et al. | |
| 2007/0169079 A1 | 7/2007 | Keller et al. | |
| 2007/0192329 A1 | 8/2007 | Croft et al. | |
| 2007/0220061 A1 | 9/2007 | Tirosh et al. | |
| 2007/0220507 A1 | 9/2007 | Back et al. | |
| 2007/0253430 A1 | 11/2007 | Minami et al. | |
| 2007/0256138 A1 | 11/2007 | Gadea et al. | |
| 2007/0271561 A1* | 11/2007 | Winner et al. | 718/1 |
| 2007/0300215 A1 | 12/2007 | Bardsley | |
| 2008/0005737 A1 | 1/2008 | Saha et al. | |
| 2008/0005798 A1 | 1/2008 | Ross | |
| 2008/0010304 A1 | 1/2008 | Vempala et al. | |
| 2008/0022384 A1 | 1/2008 | Yee et al. | |
| 2008/0034416 A1 | 2/2008 | Kumar et al. | |
| 2008/0052468 A1 | 2/2008 | Speirs et al. | |
| 2008/0082977 A1 | 4/2008 | Araujo et al. | |
| 2008/0120499 A1 | 5/2008 | Zimmer et al. | |
| 2008/0141371 A1 | 6/2008 | Bradicich et al. | |
| 2008/0163207 A1 | 7/2008 | Reumann et al. | |
| 2008/0163210 A1 | 7/2008 | Bowman et al. | |
| 2008/0165952 A1 | 7/2008 | Smith et al. | |
| 2008/0184373 A1 | 7/2008 | Traut et al. | |
| 2008/0235534 A1 | 9/2008 | Schunter et al. | |
| 2008/0294703 A1 | 11/2008 | Craft et al. | |
| 2008/0301770 A1* | 12/2008 | Kinder | 726/2 |
| 2009/0007100 A1 | 1/2009 | Field et al. | |
| 2009/0038017 A1 | 2/2009 | Durham et al. | |
| 2009/0043993 A1 | 2/2009 | Ford et al. | |
| 2009/0055693 A1 | 2/2009 | Budko et al. | |
| 2009/0113110 A1 | 4/2009 | Chen et al. | |
| 2009/0144300 A1 | 6/2009 | Chatley et al. | |
| 2009/0150639 A1 | 6/2009 | Ohata | |
| 2009/0249053 A1 | 10/2009 | Zimmer et al. | |
| 2009/0249438 A1* | 10/2009 | Litvin et al. | 726/1 |
| 2010/0071035 A1 | 3/2010 | Budko et al. | |
| 2010/0100970 A1 | 4/2010 | Chowdhury et al. | |
| 2010/0114825 A1* | 5/2010 | Siddegowda | 707/638 |
| 2010/0250895 A1 | 9/2010 | Adams et al. | |
| 2010/0281083 A1* | 11/2010 | Purtell et al. | 707/822 |
| 2010/0281133 A1 | 11/2010 | Brendel | |
| 2010/0293225 A1 | 11/2010 | Sebes et al. | |
| 2010/0332910 A1 | 12/2010 | Ali et al. | |
| 2011/0029772 A1 | 2/2011 | Fanton et al. | |
| 2011/0035423 A1 | 2/2011 | Kobayashi et al. | |
| 2011/0047543 A1 | 2/2011 | Mohinder | |
| 2011/0078550 A1 | 3/2011 | Nabutovsky | |
| 2011/0138461 A1 | 6/2011 | Bhargava et al. | |
| 2012/0030731 A1 | 2/2012 | Bhargava et al. | |
| 2012/0030750 A1 | 2/2012 | Bhargava et al. | |
| 2012/0278853 A1 | 11/2012 | Chowdhury et al. | |
| 2013/0024934 A1 | 1/2013 | Sebes et al. | |
| 2013/0091318 A1 | 4/2013 | Bhattacharjee et al. | |
| 2013/0097355 A1 | 4/2013 | Dang et al. | |
| 2013/0097356 A1 | 4/2013 | Dang et al. | |
| 2013/0117823 A1 | 5/2013 | Dang et al. | |

FOREIGN PATENT DOCUMENTS

| | | |
|---|---|---|
| EP | 2 037 657 A1 | 3/2009 |
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2008/054997 A2 | 5/2008 |
| WO | WO 2011/059877 | 5/2011 |
| WO | WO 2012/015485 | 2/2012 |
| WO | WO 2012/015489 | 2/2012 |

OTHER PUBLICATIONS

Wesley Emeneker et al., "Dynamic Virtual Clustering," 2007 IEEE International Conference on Cluster Computing, pp. 84-90.*

U.S. Appl. No. 12/946,081, entitled "Method and System for Containment of Usage of Language Interfaces," filed Nov. 15, Inventor(s) Rosen Sharma, et al. (SCOR-00700-DIV2).

U.S. Appl. No. 12/636,414, entitled "System and Method for Managing Virtual Machine Configurations," filed Dec. 11, 2009, Inventor(s): Harvinder Singh Sawhney, et al.

Kurt Gutzmann, "Access Control and Session Management in the HTTP Environment," Jan./Feb. 2001, pp. 26-35, IEEE Internet Computing.

U.S. Appl. No. 11/379,953, entitled "Software Modification by Group to Minimize Breakage," filed Apr. 24, 2006, Inventor(s): E. John Sebes et al.

U.S. Appl. No. 11/277,596, entitled "Execution Environment File Inventory," filed Mar. 27, 2006, Inventor(s): Rishi Bhargava et al.

U.S. Appl. No. 10/651,591, entitled "Method and System for Containment of Networked Application Client Software by Explicit Human Input," filed Aug. 29, 2003, Inventor(s): Rosen Sharma et al.

U.S. Appl. No. 10/806,578, entitled Containment of Network communication, filed Mar. 22, 2004, Inventor(s): E. John Sebes et al.

U.S. Appl. No. 10/739,230, entitled "Method and System for Containment of Usage of Language Interfaces," filed Dec. 17, 2003, Inventor(s): Rosen Sharma et al.

U.S. Appl. No. 10/935,772, entitled "Solidifying the Executable Software Set of a Computer," filed Sep. 7, 2004, Inventor(s): E. John Sebes et al.

U.S. Appl. No. 11/060,683, entitled "Distribution and Installation of Solidified Software on a Computer," Filed Feb. 16, 2005, Inventor(s): Bakul Shah et al.

U.S. Appl. No. 11/122,872, entitled "Piracy Prevention Using Unique Module Translation," filed May 4, 2005, Inventor(s): E. John Sebes et al.

U.S. Appl. No. 11/346,741, entitled "Enforcing Alignment of Approved Changes and Deployed Changes in the Software Change Life-Cycle," filed Feb. 2, 2006, Inventor(s): Rahul Roy-Chowdhury et al.

U.S. Appl. No. 11/182,320, entitled "Classification of Software on Networked Systems," filed Jul. 14, 2005, Inventor(s): E. John Sebes et al.

U.S. Appl. No. 11/400,085, entitled "Program-Based Authorization," filed Apr. 7, 2006, Inventor(s): Rishi Bhargava et al.

U.S. Appl. No. 11/437,317, entitled "Connectivity-Based Authorization," filed May 18, 2006, Inventor(s): E. John Sebes et al.

U.S. Appl. No. 12/290,380, entitled "Application Change Control," filed Oct. 29, 2008, Inventor(s): Rosen Sharma et al.

(56) References Cited

OTHER PUBLICATIONS

U.S. Appl. No. 12/008,274, entitled Method and Apparatus for Process Enforced Configuration Management, filed Jan. 9, 2008, Inventor(s): Rishi Bhargava et al.
U.S. Appl. No. 12/291,232, entitled "Method of and System for Computer System State Checks," filed Nov. 7, 2008, inventor(s): Rishi Bhargava et al.
U.S. Appl. No. 12/322,220, entitled "Method of and System for Malicious Software Detection Using Critical Address Space Protection," filed Jan. 29, 2009, Inventor(s): Suman Saraf et al.
U.S. Appl. No. 12/322,321, entitled "Method of and System for Computer System Denial-of-Service Protection," filed Jan. 29, 2009, Inventor(s): Suman Saraf et al.
U.S. Appl. No. 12/426,859, entitled "Method of and System for Reverse Mapping Vnode Pointers," filed Apr. 20, 2009, Inventor(s): Suman Saraf et al.
U.S. Appl. No. 12/545,609, entitled "System and Method for Enforcing Security Policies in a Virtual Environment," filed Aug. 21, 2009, Inventor(s): Amit Dang et al.
U.S. Appl. No. 12/545,745, entitled "System and Method for Providing Address Protection in a Virtual Environment," filed Aug. 21, 2009, Inventor(s): Preet Mohinder.
Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).
"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).
U.S. Appl. No. 12/551,673, entitled "Piracy Prevention Using Unique Module Translation," filed Sep. 1, 2009, Inventor(s): E. John Sebes et al.
"Desktop Management and Control," Website: http://www.vmware.com/solutions/desktop/, Retrieved and printed Oct. 12, 2009, 1 page.
"Secure Mobile Computing," Website: http://www.vmware.com/solutions/desktop/mobile.html, Retrieved and printed Oct. 12, 2009, 2 pages.
Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.
IA-32 Intel® Architecture Software Developer's Manual, vol. 3B; Jun. 2006; pp. 13, 15, 22 and 145-146.
Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.
Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.
Sailer et al., sHype: Secure Hypervisor Approach to Trusted Virtualized Systems, IBM research Report, Feb. 2, 2005, 13 pages.
U.S. Application U.S. Appl. No. 13/558,181, entitled "Method and Apparatus for Process Enforced Configuration Management," filed Jul. 25, 2012, Inventor(s) Rishi Bhargava et al. (SCOR-01601-DIV1).
U.S. Appl. No. 13/558,227, entitled "Method and Apparatus for Process Enforced Configuration Management," filed Jul. 25, 2012, Inventor(s) Rishi Bhargava et al. (SCOR-01601-DIV2).
U.S. Appl. No. 13/558,277, entitled "Method and Apparatus for Process Enforced Configuration Management," filed Jul. 25, 2012, Inventor(s) Rishi Bhargava et al. (SCOR-01601-DIV3).
Office Action received for Chinese Patent Application No. 201080051085.6, mailed on Jun. 18, 2014, 9 pages of Chinese Office Action and 13 pages of English Translation.
Second Office Action received for Chinese Patent Application No. 201080051085.6, mailed on Nov. 15, 2014, 12 pages of English translation.
Communication in EP Application No. 10 777 195.8-1870, mailed on Aug. 19, 2016, 3 pages.
U.S. Appl. No. 12/844,892, entitled "System and Method for Protecting Computer Networks Against Malicious Software," filed Jul. 28, 2010, Inventor(s) Rishi Bhargava, et al.
U.S. Appl. No. 12/844,964, entitled "System and Method for Network Level Protection Against Malicious Software," filed Jul. 28, 2010, Inventor(s) Rishi Bhargava, et al.
U.S. Appl. No. 12/880,125, entitled "System and Method for Clustering Host Inventories," filed Sep. 12, 2010, Inventor(s) Rishi Bhargava, et al.
U.S. Appl. No. 12/944,567, entitled "Classification of Software on Networked Systems," filed Nov. 11, 2010, Inventor(s) E. John Sebes, et al. (SCOR-01200-DIV).
U.S. Appl. No. 12/903,993, entitled "Method and System for Containment of Usage of Language Interfaces," filed Oct. 13, 2010, Inventor(s) Rosen Sharma, et al. (SCOR-00700-DIV).
U.S. Appl. No. 12/946,081, entitled "Method and System for Containment of Usage of Language Interfaces," filed Nov. 15, Inventor(s) Rosen Sharma, et al. (SCOR-00700-DIV2).
U.S. Appl. No. 12/946,344, entitled "Method and System for Containment of Usage of Language Interfaces," filed Nov. 15, 2010, Inventor(s) Rosen Sharma, et al. (SCOR-00700-DIV3).
U.S. Appl. No. 13/022,148, entitled "Execution Environment File Inventory," filed Feb. 7, 2011, Inventor(s) Rishi Bhargava, et al. (SCOR-00300-CON).
U.S. Appl. No. 13/012,138, entitled "System and Method for Selectively Grouping and Managing Program Files," filed Jan. 24, 2011, Inventor(s) Rishi Bhargava, et al.
U.S. Appl. No. 12/975,745, entitled "Program-Based Authorization," filed Dec. 22, 2010, Inventor(s) Rishi Bhargava, et al. (SCOR-01300-CON).
U.S. Appl. No. 12/976,159, entitled "Solidifying the Executable Software Set of a Computer," filed Dec. 22, 2010, Inventor E. John Sebes (SCOR-00800-CON).
Gaurav et al., "Countering Code-Injection Attacks with Instruction-Set Randomization," Oct. 27-31, 2003, ACM, pp. 272-280.
Barrantes et al., "Randomized Instruction Set Emulation to Dispurt Binary Code Injection Attacks," Oct. 27-31, 2003, ACM, pp. 281-289.
U.S. Appl. No. 13/037,988, entitled "System and Method for Botnet Detection by Comprehensive Email Behavioral Analysis," filed Mar. 1, 2011, Inventor(s) Sven Krasser, et al.
Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.
Tal Garfinkel, et al., "Terra: A Virtual Machine-Based Platform for Trusted Computing," XP-002340992, SOSP'03, Oct. 19-22, 2003, 14 pages.
Notification of International Preliminary Report on Patentability and Written Opinion mailed May 24, 2012 for International Application No. PCT/US2010/055520, 5 pages.

\* cited by examiner

SYSTEM AND METHOD FOR PREVENTING DATA LOSS USING VIRTUAL MACHINE WRAPPED APPLICATIONS

TECHNICAL FIELD

This disclosure relates in general to the field of security and, more particularly, to preventing data loss in a virtual environment.

BACKGROUND

The field of network security has become increasingly important in today's society. In particular, the ability to effectively protect computers, systems, and the data residing on such computers and systems presents a significant obstacle for component manufacturers, system designers, and network operators. This obstacle is made even more difficult due to continuously evolving security threats. Virtualization is a software technology that allows a complete operating system to run on an isolated virtual environment (typically referred to as a virtual machine), where a platform's physical characteristics and behaviors are reproduced. Virtualization can also provide for execution of a single application within a virtual machine. A virtual machine can represent an isolated, virtual environment (lying on top of a host operating system (OS) or running on bare hardware), equipped with virtual hardware (processor, memory, disks, network interfaces, etc.). Commonly, the virtual machine is managed by a virtualization product. A virtual machine monitor (VMM) is typically the virtualization software layer that manages hardware requests from a guest OS (e.g., simulating answers from real hardware). A hypervisor is typically computer software/hardware platform virtualization software that allows multiple operating systems to run on a host computer concurrently. Applications represent a unique challenge in virtual environments because they can easily be manipulated in order to infect a given computer system. Security professionals and network administrators should account for these issues in order to protect computers and systems from emerging security threats.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method in one example implementation includes selecting at least one criterion for controlling data transmission from within a virtual machine. At least one application is included within the virtual machine and the virtual machine includes a policy module. The selected criterion corresponds to at least one policy associated with the policy module. The method also includes evaluating the selected criterion of the policy to permit an attempt to transmit the data from within the virtual machine. In more specific embodiments, the policy includes a plurality of selected criteria, including a first selected criterion that permits transmission of the data to a first other application and a second selected criterion that prohibits transmission of the data to a second other application. In other more specific embodiments, the selected criterion permits transmission of the data to a client device of one of a plurality of users if the client device is requesting access to the application from within a secured network environment. In another more specific embodiment, the method includes updating the policy module through an administration module to modify the selected criterion.

Example Embodiments

Figure 1:
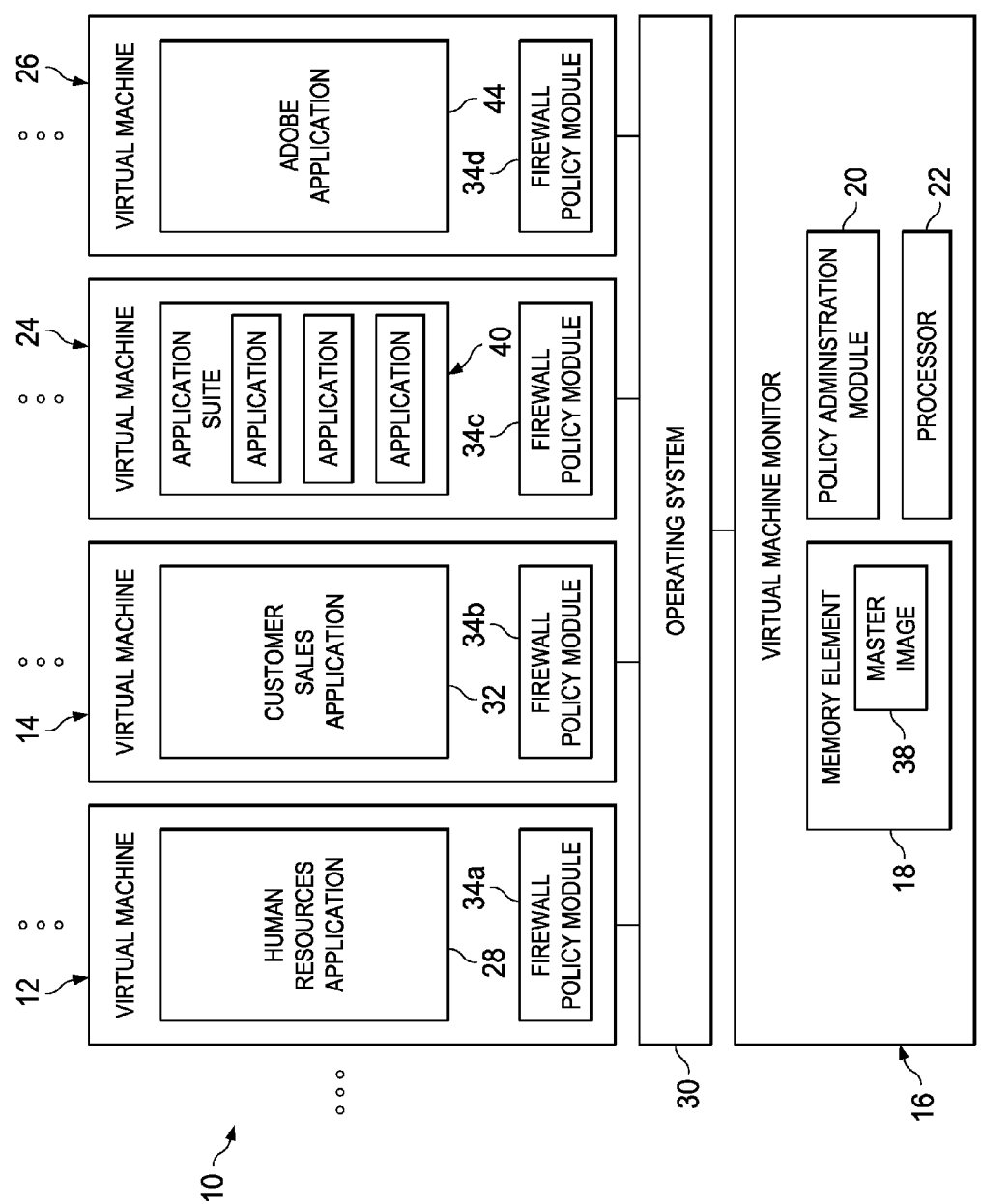
FIG. 1 is a simplified block diagram of a system for preventing data loss using virtual machine wrapped applications in accordance with one embodiment.

FIG. 1 is a simplified block diagram of a system 10 for protecting data from accidental and deliberate leakage in a virtual environment using virtual machine wrapped applications. System 10 may include a plurality of virtual machines 12, 14, 24, and 26, and an operating system 30. System 10 may also include a virtual machine monitor 16 that includes a memory element 18, a policy administration module 20, and a processor 22. Memory element 18 may contain a master image 38 with stored entries corresponding to the most current versions of software used within system 10. Each of virtual machines 12, 14, 24, and 26 includes an associated firewall policy module 34a, 34b, 34c, and 34d, respectively. Not shown in FIG. 1 is additional hardware that may be suitably coupled to operating system 30 and virtual machine monitor 16 (e.g., provided below their logical representations) in the form of memory management units (MMU), symmetric multiprocessing (SMP) elements, physical memory, Ethernet, small computer system interface (SCSI)/integrated drive electronics (IDE) elements, etc.

In example embodiments, system 10 wraps each application or suite of applications within a virtual machine in order to protect data associated with the application from accidental and deliberate leakage. For purposes of illustrating the techniques of system 10, it is important to understand the activities occurring within a given network. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typical network environments including, among others, local area networks (LANs), wide area networks (WANs), Campus Area Networks (CANs), intranets, and extranets are used by businesses, schools, and other organizations to link multiple personal computers or client devices together, along with servers that allow the client devices to access shared data and applications related to the function of the organization. In addition, these networks are often configured to provide internet connections from client devices in the network to the Internet, enabling access to the World Wide Web and possibly other networks. The data maintained by the organizations typically includes varying types and degrees of confidential data, where data such as payroll records and legal documents often requires a high degree of protection, whereas data such as customer sales may require a lesser degree of protection. Network administrators typically configure their networks to allow particular persons (or groups of persons) access to specific applications, depending upon the type and degree of confidential data associated with the applications. For example, persons working within a human resources department would possibly have access to data and applications associated with the human resources department, but not have access to data and applications associated with the legal department. This type of security is typically applied at the operating system level.

Security at the operating system level alone is flawed because it relies on individuals properly controlling the data and applications to avoid accidental and deliberate misuse of confidential data. When multiple applications are running on an operating system, it is possible to share data between them using the operating system clipboard, a file system, and the like (e.g., using copy and paste functions, save, move, send to, import and export type functions, etc.). Thus, an authorized user accessing legal department data could mistakenly (or deliberately) share a confidential legal file or data with another user who is not authorized to access such information. This could be accomplished, for example, by using copy and paste functions between the legal application and another application to store the confidential data in an unprotected memory space to which unauthorized users in the organization have access. In another example, a user could email a message from the legal application containing confidential data that was copied into the message, or included as an attachment, to an unauthorized user. In addition, temporary files may also be at risk for leaking confidential data as they are normally available within the operating system. If an application terminates before all temporary files are deleted, then those remaining temporary files could be accessed by a savvy user, or by malicious third party software. Temporary files could contain confidential data from an application being run by an authorized user, or other information that was downloaded, such as, for example, details of a user's bank account. Such temporary files are at risk of exposure because they are often not protected.

Data leakage problems can also occur when authorized users access their organization's network from an unsecured or less secure environment. For example, users often take their laptops home or otherwise outside the corporate environment and remotely logon to their organization's network. Such networks typically have a firewall, which is a device or set of devices configured to control computer traffic sent to/from the network. Firewalls are usually designed to block unauthorized access, while permitting authorized communications based upon a set of rules and other criteria. Even with appropriate firewall protections, data leakage can occur, for example, if an authorized user accesses the network from a less secure (remote) location and begins retrieving confidential data. The confidential data may travel from the firewall-protected network to the user's computer through various communication paths and networking devices such as telephone lines, cable modems, fiber optic cables, satellites, microwaves, routers, gateways, switches, etc. Furthermore, the user's computer may no longer be protected by a firewall when it is remotely accessing the organization's network, thereby exposing the user's computer to various forms of malware, which could put the confidential data at risk.

A system for preventing data loss as outlined by FIG. 1 can resolve many of these issues. In accordance with one example implementation, an application is provided to encapsulate or wrap each application or suite of applications used in a network within a virtual machine. Access to and from each virtual machine can be controlled by an associated firewall (i.e., security) policy, or any other suitable security safeguard. Confidential data, as potentially defined by the associated firewall policy, may be contained within the virtual machine wrapped application such that copy and paste buffers and temporary files would not be accessible through the main operating system underlying the virtual machine. In addition, the virtual machine wrap provides an additional layer of security on top of the operating system, which could prevent direct access to the memory where the confidential data is stored. The associated firewall policy may be evaluated to determine whether the virtual machine wrapped application is allowed to share data (e.g., using copy and paste buffers, save, move, send to, and import/export type functions, email, etc.). For example, a first virtual machine wrapped application may be allowed to share confidential data with a second virtual machine wrapped application, but not with a third virtual machine wrapped application and not with a fourth application, which may not have a virtual machine wrap. Thus, system 10 can provide focused, specific security around each application or suite of applications to control access by users and other virtual machines. Such a system could allow for any application running on the main operating system or running on an operating system of a specific device, such as an end user's client device, to be wrapped within a virtual machine. Also, system 10 could automatically generate and maintain, or a network administrator could configure and maintain, master image 38 representing particular versions (e.g., the most current version) of software, so that each virtual machine wrapped application could be updated as needed.

Generally, virtual machines can be implemented to run complete operating systems and their associated applications (system virtual machines), or to run a single application or suite of applications (process virtual machines). Virtual machines can be implemented as Type 1, running below the host operating system directly on the hardware or as Type 2, running on top of a host operating system. Both system and process virtual machines can have some type of virtualization software that manages virtual machines and any guest operating systems. As used herein in this Specification, the term 'virtual machine monitor' is meant to include hypervisors, or other software or objects that can operate to manage one or more virtual machines and allow desired policy administration as detailed below.

Note that in computing, an executable (file) can cause a computer to perform indicated tasks according to encoded instructions, as opposed to a file that only contains data. Files that contain instructions for an interpreter or virtual machine may be considered 'executables' or 'binaries' in contrast to program source code. The more generic term 'object' (as used herein in this Specification) is meant to include any such executables, binaries, kernel modules, etc., which are sought to be invoked, initiated, or otherwise executed.

Turning to the infrastructure of FIG. 1, virtual machine monitor 16 can be implemented to manage multiple applications that are each wrapped separately by a virtual machine 12, 14, 24, and 26. In one example implementation, virtual machine monitor 16 can be thought of as virtualization software running on top of main operating system 30, with the plurality of virtual machines 12, 14, 24, and 26 also running on top of existing operating system 30. Based on the particular environment or according to specific user needs, however, virtual machine monitor 16 could be implemented as a hypervisor to run on bare hardware with each virtual machine 12, 14, 24, and 26 running its own operating system. Virtual machine monitor 16 can be part of a server, a firewall, or more generically, a computer. In addition, it is within the broad teachings of this disclosure that virtual machine monitor 16, including policy administration module 20 and master image 38, may be located in a central base of the network (e.g., IT headquarters), for direct access by a network administrator to configure and maintain the system. In one example embodiment shown in FIG. 1, there is a human resources application 28 wrapped in virtual machine 12, a customer sales application 32 wrapped in virtual machine 14, an application suite 40 having multiple applications wrapped in virtual machine 24, and an Adobe® application 44 wrapped in virtual machine 26. Application suite 40 may include, for example, bundled software applications such as Microsoft® Word, Excel®, and PowerPoint®.

In this example embodiment, a user with appropriate authority such as a network administrator is provided with an interface to manage the complete setup of virtual machines 12, 14, 24, and 26 and associated firewall policy modules 34*a*, 34*b*, 34*c*, and 34*d*. This management can include configurations of the virtual machine monitor and the virtual machines, creation, deletion, modification, shutdown, updating, and startup of the virtual machines, etc. The interface may allow the network administrator to initially configure and maintain master image 38 comprising entries that correspond to particular versions of the applications within the network. Alternatively, system 10 may automatically generate and update master image 38. Through policy administration module 20, the network administrator can select desired specific criteria for the policies to be applied to each virtual machine 12, 14, 24, and 26, through respective firewall policy modules 34*a*, 34*b*, 34*c*, and 34*d*. The policies can be tailored to meet particular desired security for data depending upon, for example, the confidentiality of the data accessible through the virtual machine wrapped application, the particular users seeking access to the data, particular job titles, particular department types, particular timestamps of information, particular locations in which a request for data access originates, particular days and times of days a request for data access originates, specifically configured permissions, etc. Once virtual machines 12, 14, 24, and 26 are configured with associated firewall policy modules 34*a*, 34*b*, 34*c*, and 34*d*, the virtual machines can be deployed to targeted computers, such as an end user's client device, a server, or any other device configured to host the virtual machine wrapped applications, which can be made accessible to authorized users. Policy administration module 20 is also configured to allow the network administrator to maintain virtual machines 12, 14, 24, and 26 and to update or change the security policies on firewall policy modules 34*a*, 34*b*, 34*c*, and 34*d*, as needed.

A first level of security associated with system 10 can relate to authentication. Authentication determines whether a user is authorized to access the network and within the network, which particular applications or data the user is allowed to access. Although authentication is typically applied at the operating system level, at least a portion of the authentication process may also be applied through firewall policy modules 34*a*, 34*b*, 34*c*, and 34*d*. Once an authorized user is granted access to an application within virtual machine 12, 14, 24, or 26, the associated firewall policy module 34*a*, 34*b*, 34*c*, or 34*d* may restrict what the user can do within the application. In one example embodiment, a policy may be applied to firewall policy module 34*a* for human resources virtual machine 12, preventing an authorized user from transmitting (e.g., copying, pasting, moving, sending, exporting, emailing, etc.) confidential data, such as employee salary data, from human resources virtual machine 12 to another application or user, such as, for example, application suite virtual machine 24. Alternatively, if the user has a higher approved level of authorization, then the policy may be tailored to allow data transmission with data tracking. In this situation, when the user is allowed to transmit confidential data from human resources application virtual machine 12 to another application or user, the transmitted confidential data may be recorded in a data log stored in a memory element. As used herein in this Specification, the terms 'transmit' and 'transmission' are meant to encompass any operations associated with copying, cutting, pasting, saving, moving, sending, importing, exporting, emailing, or otherwise manipulating data.

Another form of policy that may be used within firewall policy modules 34*a*, 34*b*, 34*c*, and 34*d*, includes policies related to the environment from which a user requests access to particular applications. For example, if a user requests access to human resources virtual machine 12 from a client device (e.g., a laptop, etc.) when the user is physically located within the network's secure environment, then firewall policy module 34*a* can perform a check to determine if the user is within a secure environment and allow access accordingly. However, if the user is out of the office, such as on a commuter train, and is therefore outside of the network's secure environment, then because of the confidential nature of the information within human resources virtual machine 12, the policies of firewall policy module 34*a* may be configured to prohibit the user from accessing the human resources application within virtual machine 12. Thus, the protocol can prevent the user from potentially leaking data when the user is in a less secure environment. The scope of this disclosure is intended to encompass any type or combination of firewall policies desired by a particular organization for controlling data leakage from one or more of its applications within its network. Such policies include, but are not limited to, policies restricting data movement between particular applications, policies restricting application access depending upon the user's environment, policies restricting application access depending upon the time of day or particular days access is requested, and policies restricting data movement from particular applications to particular individuals or groups of individuals.

Figure 2:
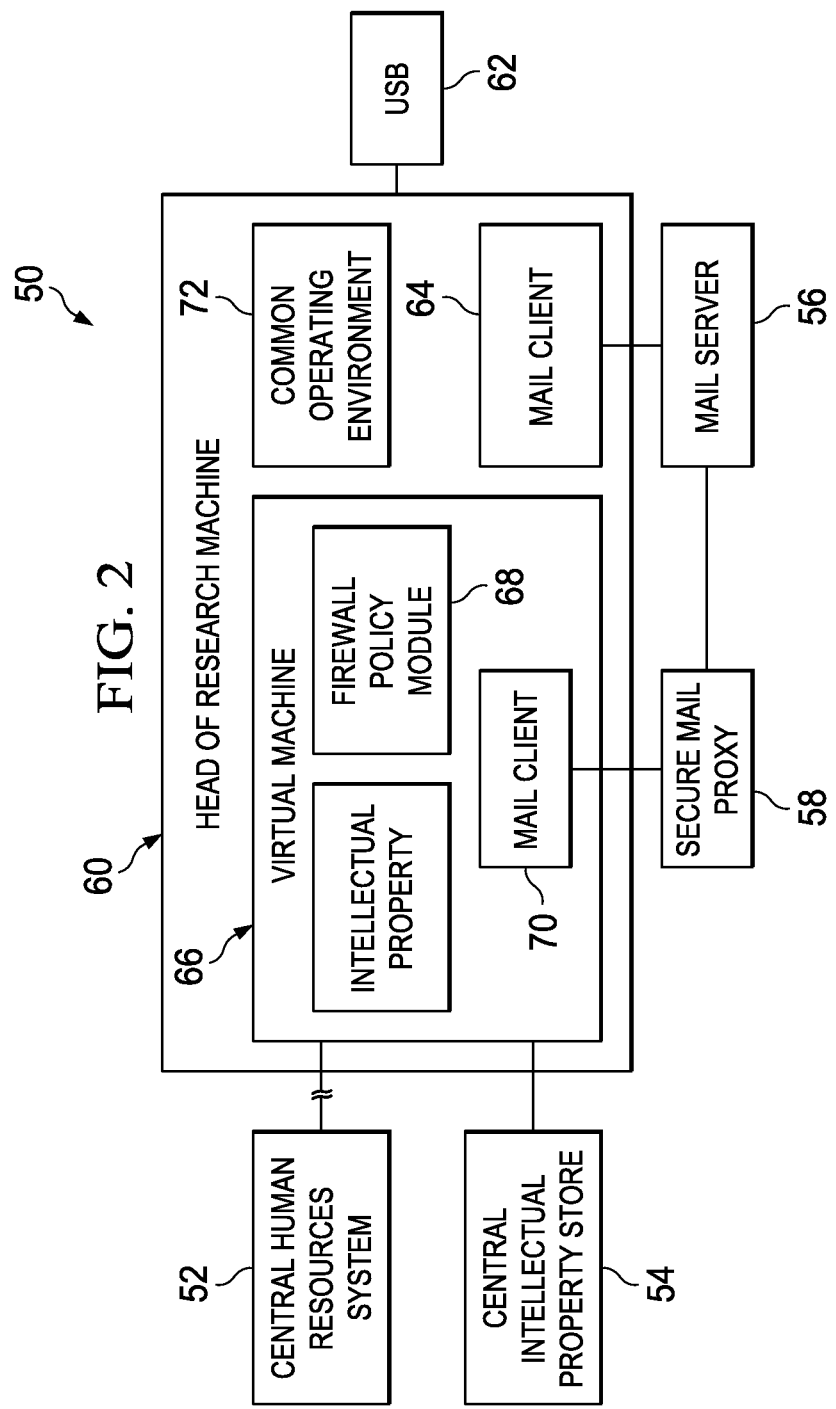
FIG. 2 is a simplified block diagram of an example embodiment of a system for preventing data loss using virtual machine wrapped applications.

Turning to FIG. 2, FIG. 2 is a simplified block diagram illustrating one implementation of a data loss prevention system 50 using virtual machine wrapped applications in accordance with the present disclosure. In this example implementation, a network of an organization, such as a corporation or other business entity, is provided with a machine 60 being logically connected to a central human resources system 52, a central intellectual property store 54, and a mail server 56, which can be part of the organization's network infrastructure. It should be noted that the term "machine" is interchangeable with the term "computer." Machine 60 includes applications in a common operating environment 72 (e.g., an operating system). These applications include a mail client 64 connected to mail server 56 for sending and receiving email communications that are not associated or linked to data or applications secured within the virtual environment. Machine 60 also includes a virtual machine 66 for accessing central intellectual property store 54. Virtual machine 66 includes a firewall policy module 68 and a mail client 70 for sending and receiving emails from virtual machine 66. A secure mail proxy 58 connects mail client 70 in virtual machine 66 to mail server 56 on the network. Machine 60 may also be configured with a USB drive 62.

In the implementation shown in FIG. 2, machine 60 may be operated by a user who is the head of research of the organization. System 50 may require authentication that the user is authorized to use machine 60 to access various resources within the network. Such an authentication could be performed by the operating system, where a unique user ID and password are validated. Once the user is properly authenticated, he/she may be allowed to access certain resources within the organization. For example, as the head of research, the user may be allowed to access central intellectual property store 54, but not central human resources system 52, as exemplified by the dashed lines connecting machine 60 to central human resources system 52 in FIG. 2. In an alternate embodiment, the user may be allowed to access central human resources system 52 for particular confidential data only, such as data corresponding to employees in the Research Department who report to the user. Allowing or blocking access to a particular resource or application may be accomplished through the operating system using the authentication mechanism described above. However, it is within the broad teachings of this disclosure to configure the system to perform authentication for access to a particular virtual machine wrapped application within its associated firewall policy module. Specifically a policy may be applied to a firewall policy module having selected criteria that is evaluated to determine whether the user is allowed to access the specific virtual machine wrapped application. If authorized, the user may access central intellectual property store 54 through virtual machine 66. Firewall policy module 68 associated with virtual machine 66 may be configured with a policy having selected criteria to control data transmissions from central intellectual property store 54. For example, the selected criteria may allow the user to access confidential data within central intellectual property store 54, but not allow the data to be copied and pasted, moved, exported, emailed or otherwise transmitted to another application. In the alternate embodiment described above, in which the user is given limited access to central human resources system 52, the selected criteria in the policy of associated firewall policy module 68 could only allow confidential data related to particular employees to be accessed by the user. The selected criteria may or may not allow the user to transmit the accessible data to other applications. As previously noted herein, it is within the broad teachings of this disclosure that the selected criteria can be configured to allow data transmission to certain applications and to prohibit data transmission to other applications.

In the particular example implementation shown in FIG. 2, the user is allowed access to email from within virtual machine 66. In this situation, any email being sent from virtual machine 66 is transmitted to secure mail proxy 58, before being sent to mail server 56. In secure mail proxy 58, the email may be screened for any confidential data protected by that particular application. Thus, the selected criteria of firewall policy module 68 would be applied to the content, attachments, and routing of the email. It is also within the broad teaching of this disclosure that a log be kept for recording entries corresponding to data that is allowed to be sent from secure mail proxy 58, thus allowing the organization to track particular data that is shared between applications and users in the organization. Finally, USB drive 62 is accessible to common operating environment 72 of machine 60, where firewall policy module 68 may include a policy with selected criteria that prevents virtual machine 66 from communicating with the USB port. This prevents users from copying protected data to a flash drive on USB drive 62, and it also protects the virtual machine wrapped application from communicating with any software application introduced to machine 60 through USB drive 62. This virtualization of individual applications with an associated firewall policy module is particularly useful for protecting data from infected software introduced to machine 60 through USB drive 62. The user of virtual machine 66 could, therefore, be limited to specific tasks within the virtual machine wrapped application in order to reduce the ability of obfuscating, or compromising confidential data.

Figure 3:
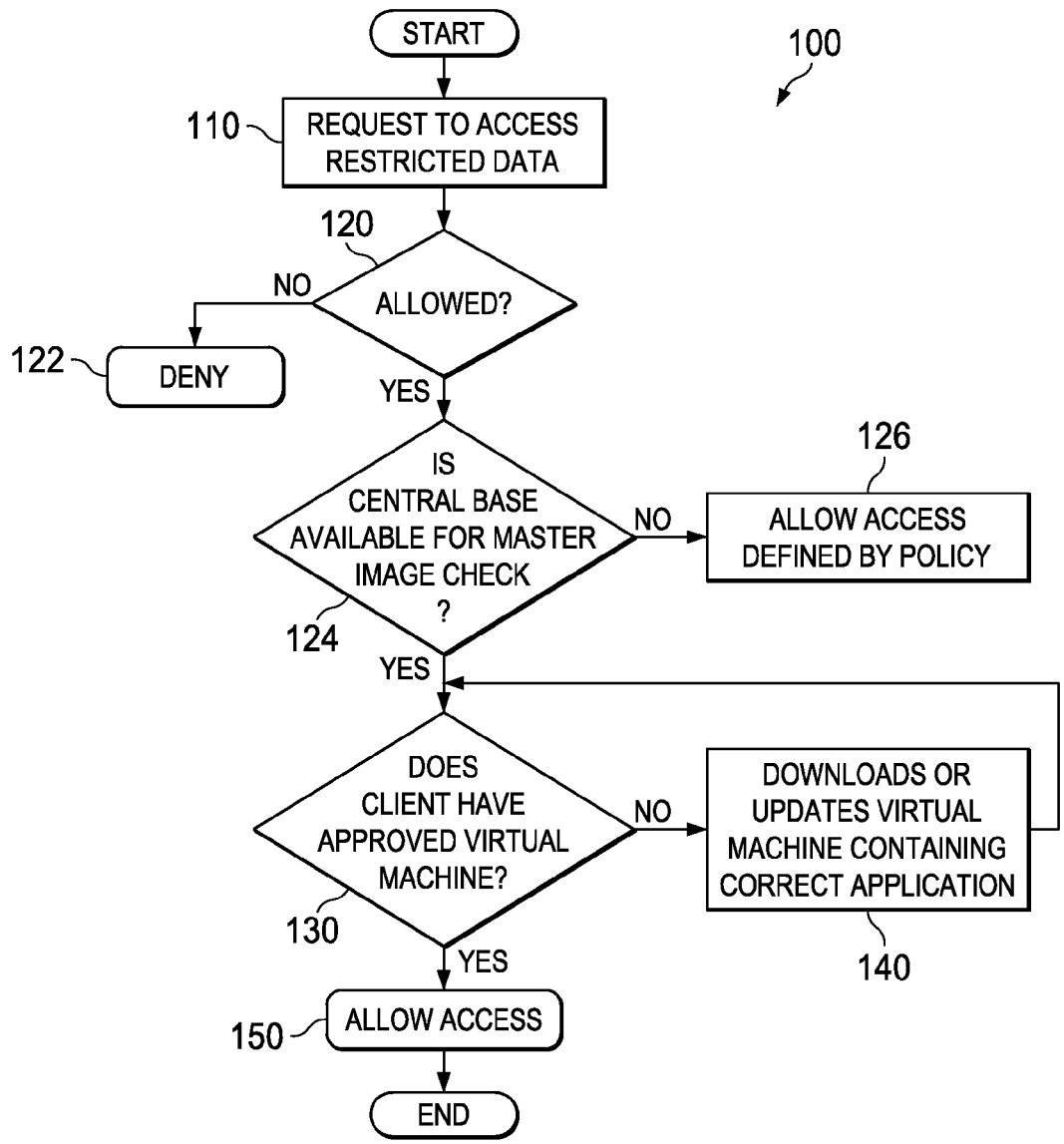
FIG. 3 is a simplified flowchart illustrating a series of example steps associated with the system in accordance with one embodiment.

Turning to FIG. 3, FIG. 3 is a simplified flowchart 100 illustrating a number of example steps associated with one implementation of a data loss prevention system. The flow may begin at step 110, where a request to access restricted data is received. At step 120, the query is answered as to whether the request to access restricted data is allowed. If the request to access restricted data is not authorized, then the flow moves to step 122 where the request is denied. If the request to access restricted data is authorized, the flow moves to step 124 where a query is made as to whether the central base is available for a master image check. If the central base is not available, the flow moves to step 126 where access will depend on the criteria of the policy, where the criteria was previously selected by the network administrator. For example, if the data is highly confidential, then the selected criteria might require the virtual machine to be disabled from operation until the central base is available for a master image check. However, if the data has a lesser degree of confidentiality, then the selected criteria may allow access to the virtual machine even without the central base checking the master image. If the central base is available for a master image check in step 124, the flow moves to step 130 where a query is made as to whether the client has an approved (i.e., a current version) virtual machine. This check is performed by searching the master image 38 to determine if the software is current, including, but not limited to, the application, the virtual machine, and the firewall policy module. If the client does not have an approved virtual machine, the flow passes to step 140 where the virtual machine is downloaded or updated to contain the correct software and the flow passes back to the query in step 130. If the client does have an approved virtual machine as queried in step 130, the flow passes to step 150 to allow access to the virtual machine. In the situation where the central base is not available for a master image check at step 124 but the selected criteria nevertheless allows access to the restricted data, then the next time the central base is available for a master image check during a request to access restricted data, the virtual machine wrapped application will be updated at step 140 if it is not current. In accordance with the teachings in this disclosure, as detailed above, the user's ability to transmit data may be restricted within the virtual machine depending upon the selected criteria in the policies of the particular firewall policy module associated with the virtual machine.

Software for configuring and maintaining the virtual machine wrapped applications and associated firewall policy modules can be provided at various locations (e.g., the central base or IT headquarters). In other embodiments, this software could be received or downloaded from a web server (e.g., in the context of purchasing individual end-user licenses for separate networks, devices, virtual machines, servers, etc.) in order to provide this system for preventing data loss using virtual machine wrapped applications. Software for controlling data transmission from within virtual machine wrapped applications in a network can also be provided at various locations (e.g., within firewall policy modules 34a, 34b, 34c, and 34d) once the virtual machine wrapped applications and associated firewall policy modules have been initially configured. In one example implementation, this software is resident in a computer sought to be protected from a security attack (or protected from unwanted, or unauthorized manipulations of data). In a more detailed configuration, this software is specifically resident in a security layer of a virtual machine and provides an interface between the virtual machine and the underlying operating system and between the virtual machine and other virtual machines within the system, which also may include (or otherwise interface with) the components depicted by FIG. 1.

In other examples, the data loss prevention software could involve a proprietary element (e.g., as part of a network security authentication solution), which could be provided in (or be proximate to) these identified elements, or be provided in any other device, server, network appliance, console, firewall, switch, information technology (IT) device, etc., or be provided as a complementary solution (e.g., in conjunction with a firewall), or provisioned somewhere in the network. As used herein in this Specification, the term 'computer' is meant to encompass these possible elements (VMMs, hypervisors, Xen devices, virtual machines or other devices, network appliances, routers, switches, gateways, processors, servers, loadbalancers, firewalls, or any other suitable device, machine, component, element, or object) operable to affect or process electronic information in a security environment. Moreover, this computer may include any suitable hardware, software, components, modules, interfaces, or objects that facilitate the operations thereof. This may be inclusive of appropriate algorithms and communication protocols that allow for the effective protection of data. In addition, the data loss prevention system can be consolidated in any suitable manner. Along similar design alternatives, any of the illustrated modules and components of FIGS. 1 and 2 may be combined in various possible configurations, all of which are clearly within the broad scope of this Specification.

In certain example implementations, the data loss prevention system outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 1) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor (as shown in FIG. 1) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EE-PROM)) or an ASIC that includes digital logic, software, code, electronic instructions, or any suitable combination thereof.

Any of these elements (e.g., a computer, a server, a network appliance, a firewall, a virtual machine monitor, any other type of virtual element, etc.) can include memory elements for storing information to be used in achieving the data loss prevention system operations as outlined herein. Additionally, each of these devices may include a processor that can execute software or an algorithm to perform the data loss prevention activities as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein (e.g., data log, master image, etc.) should be construed as being encompassed within the broad term 'memory element.' Similarly, any of the potential processing elements, modules, and machines described in this Specification should be construed as being encompassed within the broad term 'processor.' Each of the computers, network appliances, virtual elements, etc. can also include suitable interfaces for receiving, transmitting, and/or otherwise communicating data or information in a secure environment.

Figure 4:
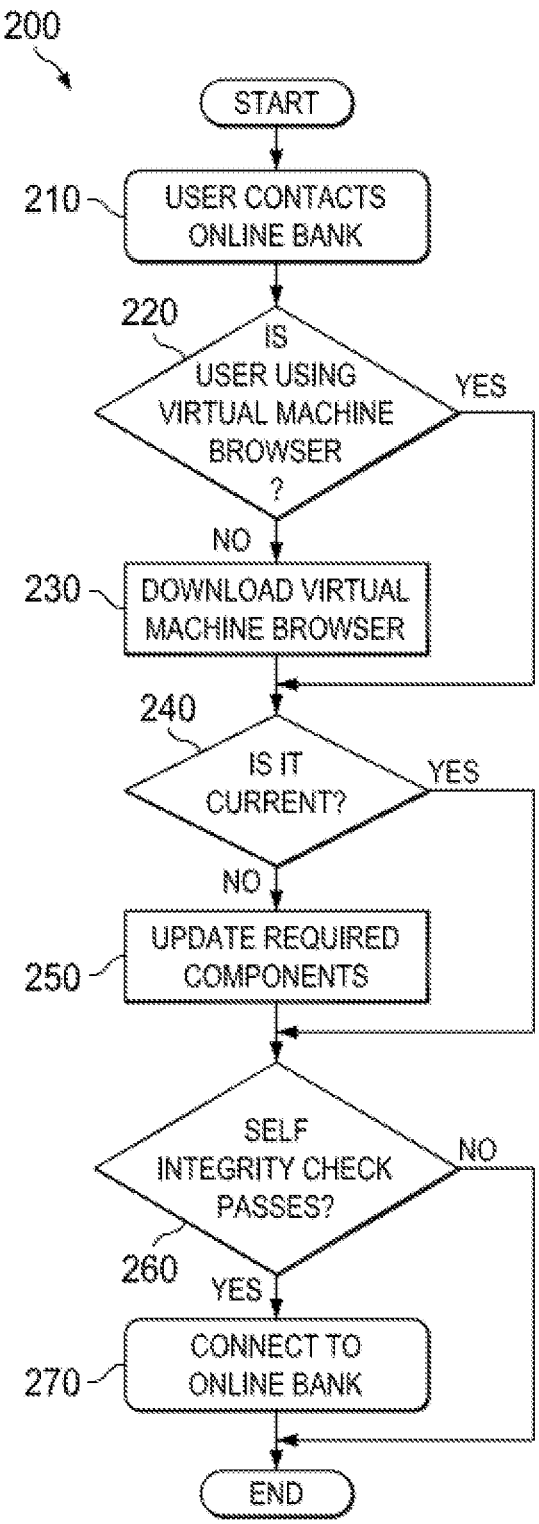
FIG. 4 is a simplified flowchart illustrating a series of example steps associated with the system in accordance with another embodiment.

FIG. 4 is a simplified flowchart 200 illustrating a number of example steps associated with another implementation of a data loss prevention system in which the application is a browser. In this particular example, an online institution asks users seeking access to the online institution to use the browser wrapped by a virtual machine. The flow may begin at step 210, where a user contacts an online institution, such as, for example, an online bank. In step 220, a query is made as to whether the user is using a virtual machine browser. If a virtual machine browser is being used, the flow passes to step 240. However, if it is determined that the user is not using a virtual machine browser, the flow passes to step 230 where a virtual machine browser is downloaded to the user, and flow then passes to 240. In step 240 a query is made to determine whether the virtual machine browser is current. If it is current, the flow passes to step 260. However, if the virtual machine browser is not current, then flow passes to step 250 where the virtual machine browser is updated or downloaded with the most current components. Flow then passes to step 260. In step 260, self-integrity checks are performed and if the user does not pass, then the session ends. However, if the user passes the self-integrity checks in step 260, the flow passes to step 270 and the user is allowed to connect to the online bank through the updated virtual machine wrapped browser.

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of components or network elements. It should be appreciated that the systems of FIGS. 1 and 2 (and their teachings) are readily scalable. System 10 can accommodate a large number of components, as well as more complicated or sophisticated arrangements and configurations. Accordingly, the examples provided should not limit the scope or inhibit the broad teachings of system 10 as potentially applied to a myriad of other architectures.

It is also important to note that the steps described with reference to the preceding FIGURES illustrate only some of the possible scenarios that may be executed by, or within, system 10. Some of these steps may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by system 10 in that any suitable arrangements, chronologies, configurations, and timing mechanisms may be provided without departing from the teachings of the discussed concepts.

What is claimed is:

1. A method, comprising:
   receiving a request from a host operating system outside a virtual machine for access to a data from a browser within the virtual machine;
   evaluating a criterion of a policy to determine whether to permit the access to the data, wherein the evaluating is performed in response to a determination that a master image is not available, the master image corresponding to a version of the virtual machine;
   downloading the browser, in response to a determination that the browser is not being used;
   comparing the browser to the master image to determine if the browser is current;
   updating the browser if the browser is determined, based on the master image, to not be current, wherein the browser is part of an application suite wrapped in the virtual machine; and
   creating a buffer for manipulating the data within the virtual machine, based on the criterion of the policy, wherein the buffer cannot be accessed by the host operating system.

2. The method of claim 1, further comprising:
   updating the policy through an administration module included in a virtual machine monitor to modify the criterion.

3. The method of claim 1, wherein the policy includes a criterion permitting an attempt to transmit the data to another application.

4. The method of claim 1, wherein a criterion of the policy permits a transmission of the data to a client device if the client device is requesting the access to the browser from within a secured network environment, and prohibits the transmission of the data to the client device if the client device is requesting the access to the browser from an unsecured network environment.

5. The method of claim 1, further comprising:
   creating a log for recording an entry corresponding to data transmitted from the virtual machine.

6. The method of claim 1, further comprising:
   sending an email message from a mail client within a virtual machine to a secure mail proxy; and
   extracting data from the email message if a criterion of the policy indicates that a recipient of the email message is not authorized to receive the extracted data.

7. One or more non-transitory computer readable storage media that include codes for execution that, when executed by a processor, are operable to perform operations comprising:
   receiving a request from a host operating system outside a virtual machine for access to a data from a browser within the virtual machine;
   evaluating a criterion of a policy to determine whether to permit the access to the data, wherein the evaluating is performed in response to a determination that a master image is not available, the master image corresponding to a version of the virtual machine;
   downloading the browser, in response to a determination that the browser is not being used;
   comparing the browser to the master image to determine if the browser is current;
   updating the browser if the browser is determined, based on the master image, to not be current, wherein the browser is part of an application suite wrapped in the virtual machine; and
   creating a buffer for manipulating the data within the virtual machine, based on the criterion of the policy, wherein the buffer cannot be accessed by the host operating system.

8. The media of claim 7, the operations further comprising:
   updating the policy through an administration module included in a virtual machine monitor to modify the criterion.

9. The media of claim 7, wherein the policy includes a criterion permitting an attempt to transmit the data to another application.

10. The media of claim 7, wherein a criterion of the policy permits a transmission of the data to a client device if the client device is requesting the access to the browser from within a secured network environment, and prohibits the transmission of the data to the client device if the client device is requesting the access to the browser from an unsecured network environment.

11. An apparatus, comprising:
    a memory element; and
    a processor that executes instructions associated with the memory element, wherein the apparatus is configured for
      receiving a request from a host operating system outside a virtual machine for access to a data from at least one browser within the virtual machine;
      evaluating, in response to a determination that a master image is not available, a criterion of a policy to determine whether to permit the access to the data, the master image corresponding to a version of the virtual machine;
      downloading the at least one browser, in response to a determination that the at least one browser is not being used;
      comparing the at least one browser to the master image to determine if the at least one browser is current;
      updating the at least one browser if the at least one browser is determined, based on the master image, to not be current, wherein the at least one browser is part of an application suite wrapped in the virtual machine; and
      creating a buffer for manipulating the data within the virtual machine, based on the criterion of the policy, wherein the buffer cannot be accessed by the host operating system.

12. The apparatus of claim 11, wherein the policy includes a criterion permitting an attempt to transmit the data to another application.

13. The apparatus of claim 11, wherein a criterion of the policy permits a transmission of the data to a client device if the client device is requesting the access to the at least one browser from within a secured network environment, and prohibits the transmission of the data to the client device if the client device is requesting the access to the at least one browser from an unsecured network environment.

14. The apparatus of claim 11, wherein the buffer is within the virtual machine.

15. The apparatus of claim 11, wherein the processor is configured to
- send an email message from a mail client within a virtual machine to a secure mail proxy; and
- extract data from the email message if a criterion of the policy indicates that a recipient of the email message is not authorized to receive the extracted data.

16. The media of claim 7, wherein the policy is configured in the virtual machine before the virtual machine is deployed.

17. The media of claim 7, wherein if a client has the version of the virtual machine, access to the virtual machine is allowed.

* * * * *